United States Patent [19]

Delamoreaux

[11] Patent Number: 5,272,594
[45] Date of Patent: Dec. 21, 1993

[54] TELEPHONE LINE OVERVOLTAGE PROTECTION DEVICE HAVING ALIGNED, BENT TERMINALS SUPPORTING A CIRCUIT BOARD

[75] Inventor: Murray I. Delamoreaux, Hoffman Estates, Ill.

[73] Assignee: Oneac Corporation, Libertyville, Ill.

[21] Appl. No.: 668

[22] Filed: Jan. 5, 1993

Related U.S. Application Data

[62] Division of Ser. No. 851,070, Mar. 13, 1992, Pat. No. 5,210,937.

[51] Int. Cl.⁵ .............................................. H05K 7/14
[52] U.S. Cl. ...................................... 361/736; 439/76; 439/92
[58] Field of Search ........................ 439/76, 79, 80, 92, 439/362; 361/119, 395, 399

[56] References Cited

U.S. PATENT DOCUMENTS

| | | | |
|---|---|---|---|
| 3,381,258 | 4/1968 | Becker, Jr. | 439/362 X |
| 4,723,196 | 2/1988 | Hofmeister et al. | 439/76 X |
| 4,856,060 | 8/1989 | Meyerhoefer et al. | 361/199 X |
| 4,865,556 | 9/1989 | Campbell et al. | 439/92 X |
| 4,899,257 | 2/1990 | Yamamoto | 361/395 |
| 5,155,649 | 10/1992 | Hung et al. | 361/119 |
| 5,175,662 | 12/1992 | De Balko et al. | 361/119 |

Primary Examiner—Leo P. Picard
Assistant Examiner—Michael W. Phillips
Attorney, Agent, or Firm—Mason, Kolehmainen, Rathburn & Wyss

[57] ABSTRACT

A telephone line overvoltage protection device includes a first terminal guard housing defining a plurality of terminal receiving channels and has a mating portion. A second housing contains a printed wiring board and includes a cooperating portion receiving the first mating portion of the first terminal guard housing in mating engagement. A plurality of terminals slidingly received in the terminal receiving channels include a grounding connecting member. Each of the terminals includes an outwardly extending terminal portion extending outside the first terminal guard housing. The outwardly extending terminal portion of each of the terminals includes a first bend defining a line of the terminal portions. The printed wiring board contains a plurality of aligned terminal receiving apertures receiving all of the outwardly extending terminal portions. The grounding connecting member includes an opposed end portion extending outwardly of the first terminal guard housing having a second bend so as to position the opposed end portion of the grounding connecting member perpendicular to the printed wiring board.

5 Claims, 2 Drawing Sheets

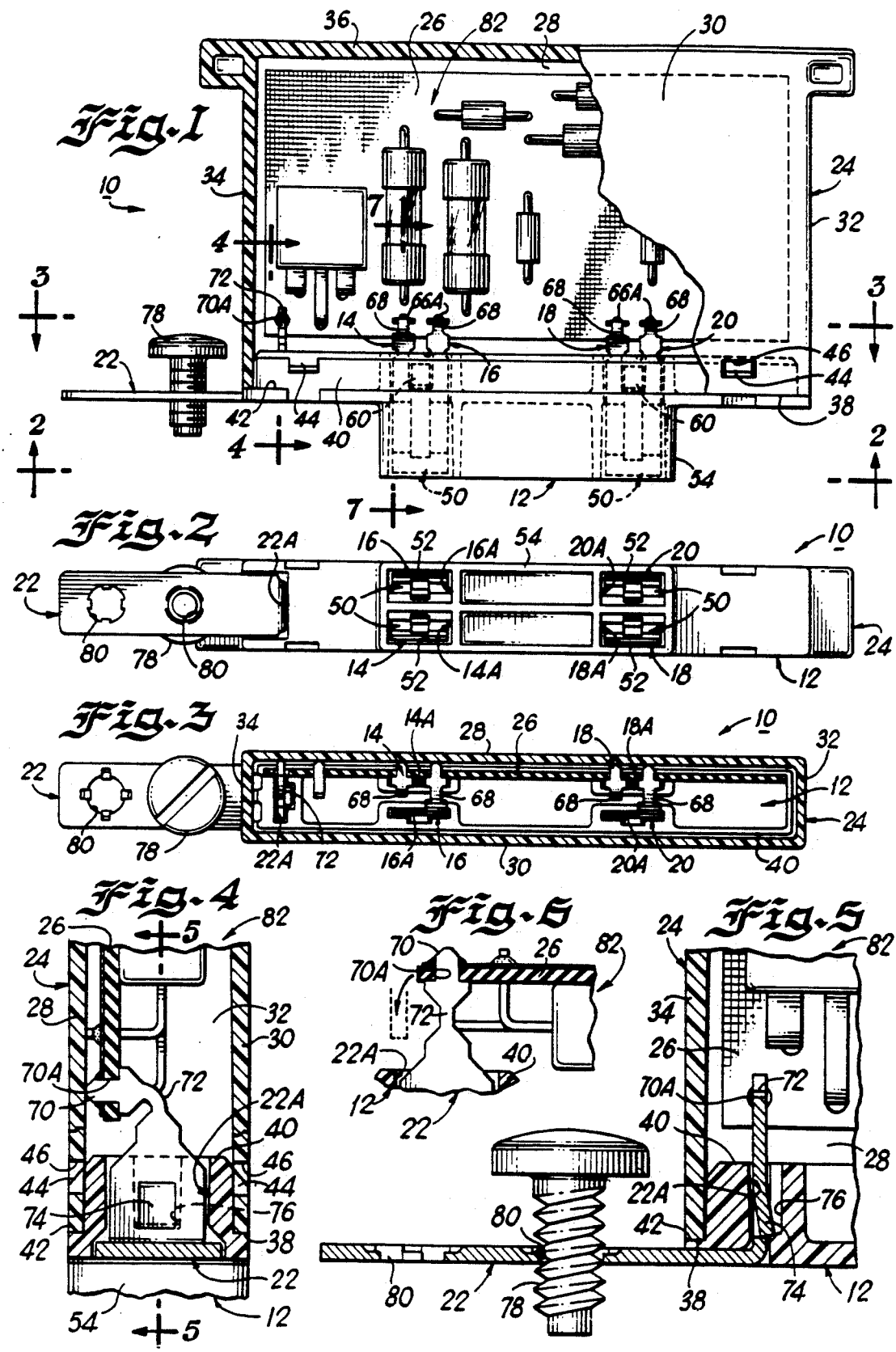

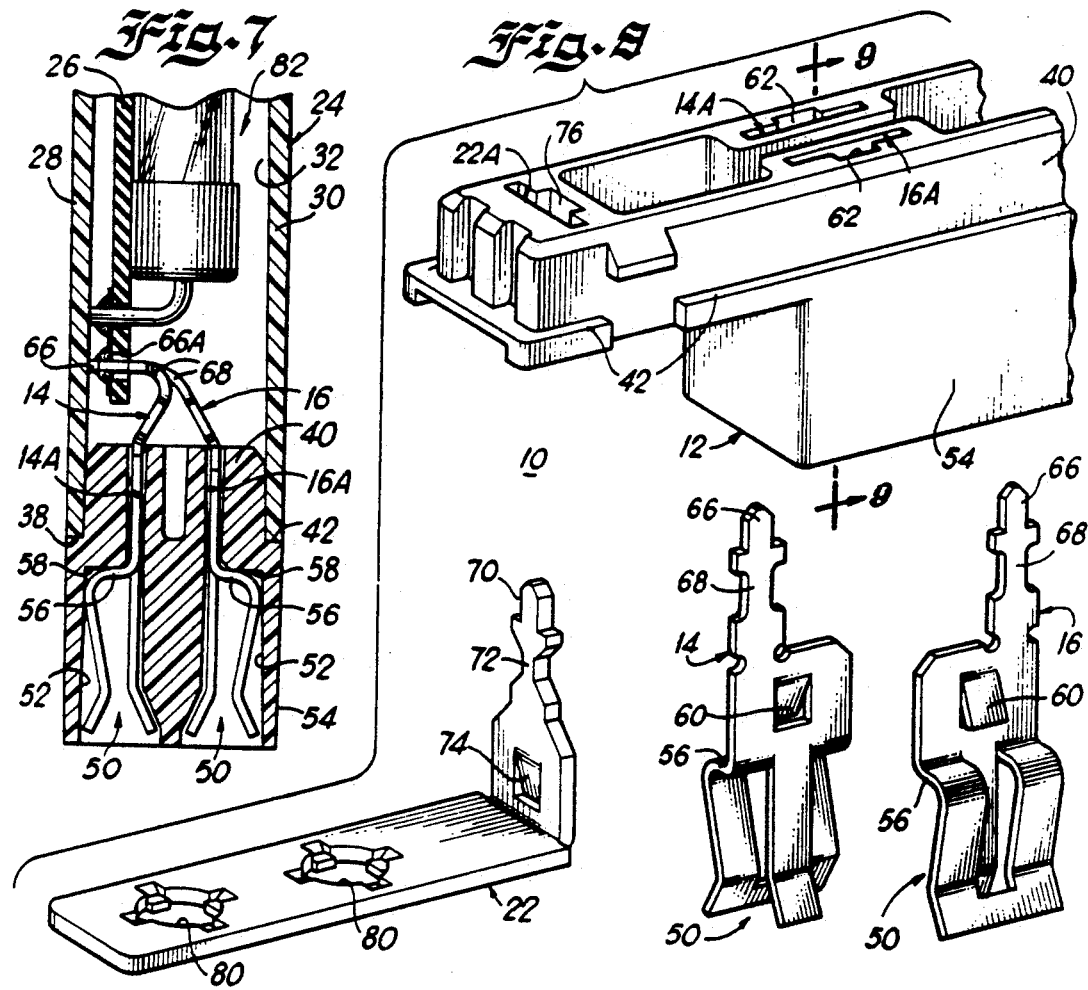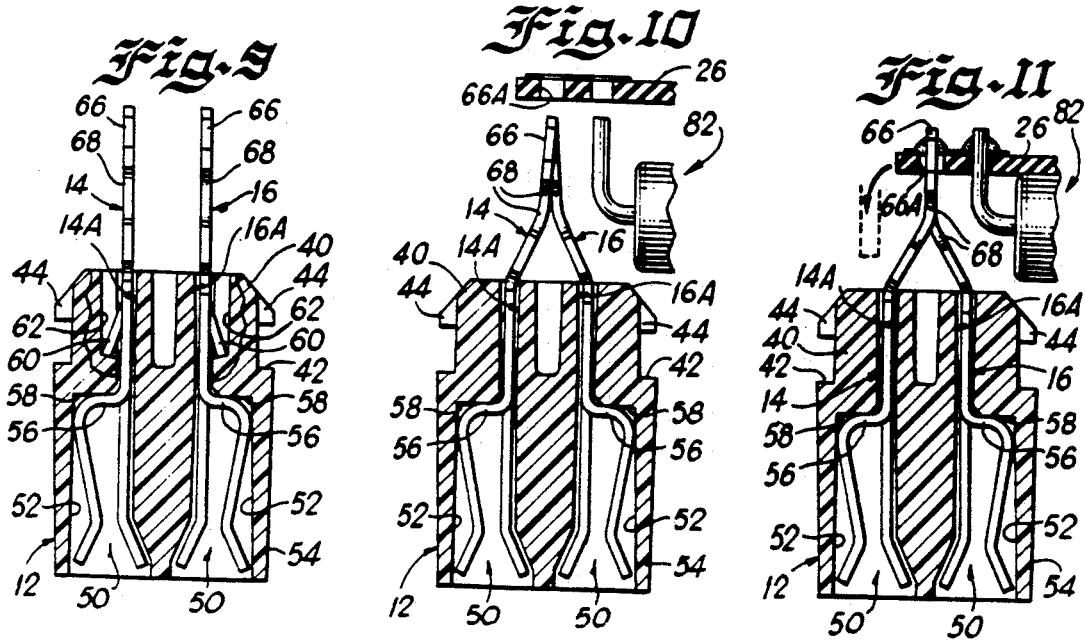

TELEPHONE LINE OVERVOLTAGE PROTECTION DEVICE HAVING ALIGNED, BENT TERMINALS SUPPORTING A CIRCUIT BOARD

This is a divisional application of application Ser. No. 07/851,070 filed on Mar. 13, 1992, now U.S. Pat. No. 5,210,937.

BACKGROUND OF THE INVENTION

1. Field of the Invention

The present invention relates generally to telephone line overvoltage protection device and more particularly to an improved configuration of a telephone line overvoltage protection device.

2. Description of the Prior Art

Overvoltage protection devices are commonly used with telephone lines for protecting telephone equipment against hazardous voltages due to lightning or power surges. Overvoltage protection circuitry that overcomes many disadvantages of the prior art circuitry is disclosed in McCartney, U.S. Pat. No. 4,758,920, issued Jul. 19, 1988 and McCartney et al., U.S. Pat. No. 4,941,063, issued Jul. 10, 1990 and both assigned to the assignee of the present invention.

U.S. Pat. No. 4,971,581 issued Nov. 20, 1990 and assigned to the assignee of the present invention, discloses a connector guard for use with a telephone line overvoltage protection device of the type having a plurality of terminals for electrical and mechanical connection with a telephone connector block. The connector guard is an electrically insulative housing defining a plurality of terminal receiving channels providing electrical insulation between adjacent terminals and adjacent ones of the telephone line overvoltage protection devices. While the disclosed connector guard overcomes many disadvantages of known telephone connector block assemblies and provides improved reliability, it is desirable to provide a telephone line overvoltage protection device configured for facilitating manufacture, assembly and use.

Problems with known protection devices generally effective for overvoltage noise and transient protection include the complexity, the difficulty and time required for manufacture and assembly.

SUMMARY OF THE INVENTION

Among the principal objects of the present invention are to provide an improved telephone line overvoltage protection device; to provide a telephone line overvoltage protection device facilitating manufacture, assembly and improved reliability; and to provide a telephone line overvoltage protection device overcoming many of the disadvantages of known overvoltage protection devices.

In brief, the objects and advantages of the present invention are achieved by a telephone line overvoltage protection device. A first terminal guard housing defines a plurality of terminal receiving channels and has a first mating portion. A second housing contains a printed wiring board and includes a cooperating portion receiving the first mating portion of the first terminal guard housing in mating engagement. A plurality of terminals slidingly received in the terminal receiving channels include a grounding connecting member. Each of the terminals includes an outwardly extending terminal portion extending outside the first terminal guard housing. The outwardly extending terminal portion of each of the terminals includes a first bend defining a line of the terminal portions corresponding to a plurality of terminal receiving apertures in the printed wiring board. The printed wiring board contains a plurality of aligned terminal receiving apertures receiving all of the outwardly extending terminal portions. The grounding connecting member includes an opposed end portion extending outwardly of the first terminal guard housing having a second bend so as to position the opposed end portion of the grounding connecting member perpendicular to the printed wiring board.

BRIEF DESCRIPTION OF THE DRAWING

The present invention together with the above and other objects and advantages may best be understood from the following detailed description of the embodiment of the invention illustrated in the drawing, wherein:

FIG. 1 is an elevational view partly broken away of a telephone line overvoltage protection device constructed in accordance with the present invention; and FIG. 2 is an elevational view of the telephone line overvoltage protection device viewed from the line 2—2 of FIG. 1;

FIG. 3 is a sectional view of the telephone line overvoltage protection device viewed from the line 3—3 of FIG. 1;

FIG. 4 is a sectional view of the telephone line overvoltage protection device viewed from the line 4—4 of FIG. 1;

FIG. 5 is a sectional view of the telephone line overvoltage protection device viewed from the line 5—5 of FIG. 4;

FIG. 6 is a fragmentary sectional view similar to FIG. 5 illustrating a grounding member after being inserted into the printed wiring board and soldered and before being aligned to its assembled condition;

FIG. 7 is a sectional view of the telephone line overvoltage protection device viewed from the line 7—7 of FIG. 1;

FIG. 8 is a fragmentary exploded perspective view of a portion of the telephone overvoltage protection device of FIG. 1 constructed in accordance with the present invention;

FIG. 9 is a sectional view of the telephone line overvoltage protection device viewed from the line 9—9 of FIG. 8 illustrating a pair of terminal clips first inserted into the base guard;

FIG. 10 is a similar view to FIG. 9 illustrating the pair of terminal clips after being aligned for insertion into a printed wiring board; and FIG. 11 is a similar view to FIG. 10 illustrating the pair of terminal clips after being inserted into the printed wiring board and soldered.

DETAILED DESCRIPTION OF THE PREFERRED EMBODIMENT

Referring now to the drawings, in FIGS. 1-11 there is illustrated a telephone line overvoltage protection device designated as a whole by the reference character 10 and constructed in accordance with principles of the present invention. Having reference to FIGS. 1 and 8, the telephone line overvoltage protection device 10 includes a terminal guard base generally designated 12 for receiving and positioning terminal clips 14, 16, 18 and 20 and a grounding member 22 within corresponding apertures 14A, 16A, 18A, 20A, and 22A and a housing 24 containing a printed wiring board 26.

Terminal guard base 12 provides electrical insulation between adjacent terminal clips 14, 16, 18 and 20 of each overvoltage protection device 10 and adjacent ones of the overvoltage protection devices 10. Multiple telephone line overvoltage protection devices 10 are used in conjunction with a conventional, compact telephone connector block (not shown) for connecting with subscriber telephone lines. Each overvoltage protection device 10 is operatively connected to the tip and ring lines of an individual telephone subscriber line (not shown) via the terminal clips 14, 16, 18 and 20.

Referring to FIGS. 1, 3, 4, 5 and 7, housing 24 is a unitary molded body having a pair of opposed sidewalls 28 and 30, a pair of opposed endwalls 32 and 34, a top wall 36 and an open bottom mating face 38 for slidingly receiving an upper wall portion 40 of the terminal guard base 12 until a recessed stop surface or ledge 42 is engaged. Each of two pairs of opposed wedges or fingers 44 of the upper wall portion 40 is received and retained in a corresponding aperture or opening 46 of the sidewalls 30 and 32 for a snap-fit, releasable mounting of the terminal guard base 12 with the housing 24.

Resilient, spring clip terminals such as best shown in FIGS. 7, 8 and 9 can be used for terminal clips 14, 16, 18 and 20, although various different terminal types can be employed. Terminal clips 14, 16, 18 and 20 include a lower spring clip portion 50 adapted for electrical and mechanical engagement with corresponding terminal blades of a telephone connector block (not shown). Each lower spring clip portion 50 is slidingly received within a terminal receiving channel 52 formed in a lower wall portion 54 of the terminal guard base 12. A shoulder terminal portion 56 engages a recessed stop surface 58 of the channel 52 and a locking terminal portion 60 engages a stop surface 62 for positioning and locking the terminal clip.

Referring now to FIGS. 2, 3, 8 and 9, an upper terminal portion 66 extends above the terminal guard base 12 in both the assembled condition of the overvoltage protection device 10 and an initial subassembly of the terminals with the terminal guard base 12. Bending of the terminal clips approximately at right angles is provided generally at a narrow terminal portion 68 after the terminal portions 66 are soldered to the printed wiring board 26.

Referring now to FIGS. 2, 3, 4, 5, 6 and 8, an upper portion 70 of the grounding member 22 extends above the terminal guard base 12 in both the assembled condition of the overvoltage protection device 10 and an initial subassembly of the terminals and grounding member with the terminal guard base 12. Bending of the grounding member 22 is provided generally at a narrow portion 72 after the grounding member 22 is soldered to the printed wiring board 26. A locking portion 74 engages a stop surface 76 for positioning and locking the grounding connecting member 22 with the terminal guard base 12. The grounding connecting member 22 of the overvoltage protection device 10 is connected with ground potential via a grounding screw 78 received through one of a pair of coined apertures 80 in the grounding member 22. Coining of the aperture 80 effectively provides a temporary lock of the grounding screw with the overvoltage protection device 10 so that the grounding screw 78 is not lost before the overvoltage protection device 10 is installed.

Printed wiring board 26 carries overvoltage protection circuitry generally designated 82 for connection with the individual telephone subscriber lines. Overvoltage protection circuitry 82 that advantageously can be used is disclosed by U.S. Pat. Nos. 4,758,920 and 4,941,063.

In accordance with features of the invention, assembly of the overvoltage protection device 10 eliminates the need for hand soldering and is inexpensive to manufacture due to the simple and efficient arrangement of the overvoltage protection device.

Assembly of the overvoltage protection device 10 is best understood with reference to FIGS. 9, 10, 11 and 7. Referring to FIG. 9, initially the terminal clips 14, 16, 18 and 20 are slidingly received within corresponding apertures 14A, 16A, 18A and 20A the terminal guard base 12. Referring to FIGS. 1 and 10, then the upper terminal portions 66 of terminal clips 14, 16, 18 and 20 and upper portion 70 of the grounding member 22 are formed in a straight line aligned for insertion within corresponding apertures 66A, 70A in the printed wiring board 26. FIG. 11 illustrates the terminal clips 14, 16, 18 and 20 after being wave soldered to the printed wiring board 26. The straight line alignment of the terminal clips 14, 16, 18 and 20 permits bending of the terminal clips generally at the narrow terminal portion 68 after being soldered to the printed wiring board. The assembled condition of the overvoltage protection device 10 is illustrated in FIGS. 1-7.

Preferably, both the housing 24 and terminal guard base 12 of the telephone line overvoltage protection device 10 are a unitary member formed of strong, flexible electrically insulating material. A plastic or similar, synthetic resin material forms both the housing 24 and terminal guard base 12 of the telephone line overvoltage protection device 10 by conventional injection molding techniques.

While the invention has been described with reference to details of the illustrated embodiment, these details are not intended to limit the scope of the invention as defined in the appended claims.

I claim:

1. An overvoltage protection device comprising:
    a first terminal guard housing defining a plurality of terminal receiving channels and having a first mating portion;
    a printed wiring board having a plurality of electronic components mounted thereon;
    a second housing containing said printed wiring board and including a cooperating portion receiving said first mating portion of said first terminal guard housing in mating engagement;
    a plurality of terminals slidingly received in said terminal receiving channels; said plurality of terminals including a grounding connecting member; each of said terminals including an outwardly extending terminal portion extending outside said first terminal guard housing and each of said terminal portions including a first bend so as to define a line of said terminal portions;
    said printed wiring board containing a plurality of aligned terminal receiving apertures receiving all of said outwardly extending terminal portions; said terminal portions being soldered to said printed wiring board and said grounding connecting member including an opposed end portion extending outwardly of said first terminal guard housing and having a second bend so as to position said opposed end portion of said grounding connecting member perpendicular to said printed wiring board.

2. An overvoltage protection device as recited in claim 1 wherein each of said first terminal guard housing and said second housing is a unitary member formed of an electrically insulative material.

3. An overvoltage protection device as recited in claim 1 wherein each of said first terminal guard housing and said second housing is a unitary molded body formed of a synthetic resin material.

4. An overvoltage protection device as recited in claim 1 further includes a fastener for connection to ground potential and said opposed end portion of said grounding connecting member includes a coined aperture receiving said fastener.

5. An overvoltage protection device as recited in claim 1 wherein said first terminal guard housing and said second housing include cooperating portions for snap-fit releasable mating engagement.

* * * * *